US012553172B2

(12) United States Patent
Lowe

(10) Patent No.: US 12,553,172 B2
(45) Date of Patent: Feb. 17, 2026

(54) DRYER SEALS FOR A CLOTHES DRYERS AND RELATED METHODS

(71) Applicant: Felters of South Carolina, LLC, Roebuck, SC (US)

(72) Inventor: Vernon J. Lowe, Greenback, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 1042 days.

(21) Appl. No.: 17/524,303

(22) Filed: Nov. 11, 2021

(65) Prior Publication Data

US 2022/0145520 A1 May 12, 2022

Related U.S. Application Data

(60) Provisional application No. 63/112,170, filed on Nov. 11, 2020.

(51) Int. Cl.
*D06F 58/04* (2006.01)
*F16J 15/3288* (2016.01)

(52) U.S. Cl.
CPC .......... *D06F 58/04* (2013.01); *F16J 15/3288* (2013.01)

(58) Field of Classification Search
CPC .............................. D06F 58/04; F16J 15/3288
See application file for complete search history.

(56) References Cited

U.S. PATENT DOCUMENTS 1,683,941 A 9/1928 Wirfs
2,050,050 A 8/1936 Flora
2,459,720 A 1/1949 Poltorak
2,895,759 A 7/1959 Conrad et al.
3,020,185 A 2/1962 Moffitt, Jr. et al.
3,086,216 A 4/1963 Brooks et al.
(Continued)

FOREIGN PATENT DOCUMENTS

WO WO-2019164201 A1 * 8/2019 ............. D06F 58/04

OTHER PUBLICATIONS

Translation, WO-2019164201-A1 (Year: 2019).*

*Primary Examiner* — Jessica Yuen
(74) *Attorney, Agent, or Firm* — Michael Best & Friedrich LLP

(57) ABSTRACT

Dryer seals for use in clothes dryers and related methods are provided. The dryer seal can comprise a first substrate that can comprise a body of the dryer seal. The first substrate can have a first end and a second end and a first side and a second side. The first end and the second end of the first substrate can be secured together so that the first base substrate forms at least a portion of an annular shape. The first side of the first substrate can be configured to form a side of the dryer seal that extends toward a bulkhead of a dryer and the second side of the first substrate can be configured to be attached to a drum of a dryer when the dryer seal is installed on a drum in the dryer. The dryer seal can also comprise a second substrate that can be secured to the first substrate. The second substrate can have a first side configured to extend past the first side of the first substrate to form a contact surface of the dryer seal for contacting the bulkhead of the dryer and a second side that can be secured to the first substrate between the first side and the second side of the first substrate. A pointbond nonwoven substrate is secured between the first substrate and the second substrate.

21 Claims, 8 Drawing Sheets

(56) References Cited

U.S. PATENT DOCUMENTS

| | | | |
|---|---|---|---|
| 3,436,838 | A | 4/1969 | Helfrich |
| 3,570,138 | A | 3/1971 | Douglas et al. |
| 3,637,224 | A | 1/1972 | Triplett et al. |
| 3,816,942 | A | 6/1974 | Smith |
| 3,828,445 | A | 8/1974 | Smoot |
| 3,875,686 | A | 4/1975 | Smoot |
| 4,156,533 | A | 5/1979 | Close et al. |
| 4,214,571 | A | 7/1980 | Scherer |
| 4,381,612 | A | 5/1983 | Shank |
| 4,669,200 | A | 6/1987 | Carr |
| 5,127,169 | A | 7/1992 | Ellingson |
| 5,156,360 | A | 10/1992 | Shine |
| 5,216,823 | A | 6/1993 | Ripley |
| 5,288,354 | A | 2/1994 | Harris et al. |
| 5,363,569 | A | 11/1994 | Kadakia |
| 5,383,316 | A | 1/1995 | Burke et al. |
| 5,407,214 | A | 4/1995 | Lew et al. |
| 5,509,669 | A | 4/1996 | Wolfe et al. |
| 5,548,908 | A | 8/1996 | Torborg et al. |
| 5,628,520 | A | 5/1997 | Ueda et al. |
| 5,765,838 | A | 6/1998 | Ueda et al. |
| 6,398,415 | B1 | 6/2002 | Ibe et al. |
| 6,675,496 | B1 | 1/2004 | Moon et al. |
| 7,007,955 | B2 | 3/2006 | Cross et al. |
| 8,510,996 | B2 | 8/2013 | Foster et al. |
| 9,562,610 | B2 | 2/2017 | Lowe et al. |
| 9,970,705 | B2 | 5/2018 | Lowe |
| 10,113,646 | B2 | 10/2018 | Lowe et al. |
| 10,508,379 | B2 | 12/2019 | Lowe |
| 10,648,563 | B2 | 5/2020 | Lowe |
| 2005/0017459 | A1 | 1/2005 | Cross et al. |
| 2006/0111003 | A1 | 5/2006 | Balthes |
| 2006/0178064 | A1 | 8/2006 | Balthes et al. |
| 2007/0044342 | A1 | 3/2007 | Burns et al. |
| 2007/0074419 | A1 | 4/2007 | Starrett |
| 2007/0116991 | A1 | 5/2007 | Balthes et al. |
| 2007/0130790 | A1 | 6/2007 | Jung |
| 2007/0141318 | A1 | 6/2007 | Balthes |
| 2008/0090477 | A1 | 4/2008 | Balthes et al. |
| 2013/0097937 | A1 | 4/2013 | Flasher |
| 2014/0248814 | A1 | 9/2014 | Handermann |
| 2014/0327212 | A1 | 11/2014 | Lowe et al. |
| 2015/0132564 | A1 | 5/2015 | Arfsten et al. |
| 2018/0128373 | A1 | 5/2018 | Lowe |
| 2018/0274160 | A1 | 9/2018 | Lowe |

* cited by examiner

DRYER SEALS FOR A CLOTHES DRYERS AND RELATED METHODS

RELATED APPLICATION

The presently disclosed subject matter claims the benefit of U.S. Provisional Patent Application Ser. No. 63/112,170, filed Nov. 11, 2020, the disclosure of which is incorporated herein by reference in its entirety.

TECHNICAL FIELD

The present subject matter relates to dryer seals and related methods. In particular, the present subject matter relates dryer seals for use in clothes dryer appliances used to reduce air leakage from within a dryer drum during usage of the dryer and raise the efficiency of the dryer.

BACKGROUND

Domestic clothes dryers are a common household appliance that, in conjunction with domestic washers, have reduced the burden of laundry on many households by reducing the amount of time devoted by household caregivers to washing and drying clothes. Such clothes dryers typically include a housing (also known as a bulkhead) and a rotating drum, or cylinder, supported within the housing. Commercially available air vented domestic clothes dryers use the rotating drum to tumble loads of washed clothes in a heated environment by generally using a blower/fan to pull ambient air across heater coils to raise the temperature of air passing into the drum. The heated air is pulled through the tumbling clothes and out through a lint screen for discharge. Commercially available condensing domestic clothes dryers also use the rotating cylinder to tumble loads of laundry in a heated environment but treat the air in a slightly different manner. These condensing domestic clothes dryers use a blower/fan to pull ambient air across heater coils into the drum, through the tumbling clothes and out through a lint screen, across a condenser coil to remove moisture, and then return to the drum.

Both types of dryers use dryer seals to support and seal the drum usually at both ends. These dryer seals perform a multitude of functions within these domestic clothes dryers. Current seals are made with felt nonwoven materials produced with varying percentages of wool and polyester and also on occasions the addition of vinyl or some low friction material. In particular, these seals are usually in the form of rings of felt which may be disposed between the housing and the drum so as to bear against the drum as it rotates. The materials of the ring can interact to form an elastic fit or may be glued into position depending on the arrangement of components.

The seals serve as a friction surface between the rotating drum and the bulkhead sections while also maintaining a seal to hold drying heat within the drum. In particular, the use of seals is desirable to reduce the friction, or prevent the creation of excess friction, between the drum and the bulkhead and to prevent air leakage between the drum and the clothes dryer cabinet which could detrimentally affect the air flow system of the dryer.

The structure of the seals can vary depending on the type, commercial brand and design of the dryer. Many current seals have multi-layered ring structures incorporating a folded over exterior layer such as wool-blend, polyester, rayon, aramid fibers or polyester blend nonwoven material. These multi-layered ring structured seals can be folded and stitched to assume different shapes to perform their intended functions within an appropriate dryer design. In some embodiments, a spacer material such as polyester or polyester blend material can also be included that can be held within the folded over exterior. The folded materials can form legs that project outwardly from the folded edge. These legs can have a sealing contacting relationship with the rotating drum. In such seal embodiments, the spacer material can typically be held in place by two seams with a first positioning seam running between an upper edge of the spacer material and one side of the folded over exterior and a second holding seam extending at an inboard position through all three layers so as to establish a coordinated stable structure.

In some clothes dryers, current rear drum dryer seal used can have limited airflow/heat sealing properties and its primary purpose is to prevent small garments leaving the drum during the drying process. These dryer seals are designed to be glued to the rim or the rotating drum. The attachment parts of these seals are PET nonwoven with a sewn 'tonsil' feature to form some form of airflow encumbrance/seal between the rotating drum and the rear backplate of the dryer. Due to worn tooling and lack of attention to quality and the variations in components, the sealing feature of these dryer seals are rendered virtually useless. A vinyl ribbon is attached/sewn to the PET tonsil to provide a support for the component when it is glued to the drum. It can help hold the seal in place while the adhesive sets. These dryer seals can have an aramid wiper that is designed to contain the fire inside the drum during a combustion event. In the dryer seals, this component is sewn over the vinyl ribbon and the PET substrate that forms the tonsil. However, due to the aramid wiper making irregular contact with the rear bulkhead, these dryer seals provide very limited sealing properties due to a lack of energizing of the soft and flexible aramid and the poor tolerancing of the major components.

As such, a need exists for improved dryer seals that can help reduce air leakage from within a dryer drum and raise the efficiency of the dryer.

SUMMARY

The present subject matter provides seals for use in clothes dryers and related methods. In particular, dryer seals for use in clothes dryer appliances are provided that can reduce air leakage from within a dryer drum during usage of the dryer and raise the efficiency of the dryer. Methods related to the manufacture and use of the dryer seals disclosed herein are also provided.

Thus, it is an object of the presently disclosed subject matter to provide dryer seals that reduce air leakage from within a dryer drum and raise the efficiency of the dryer. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
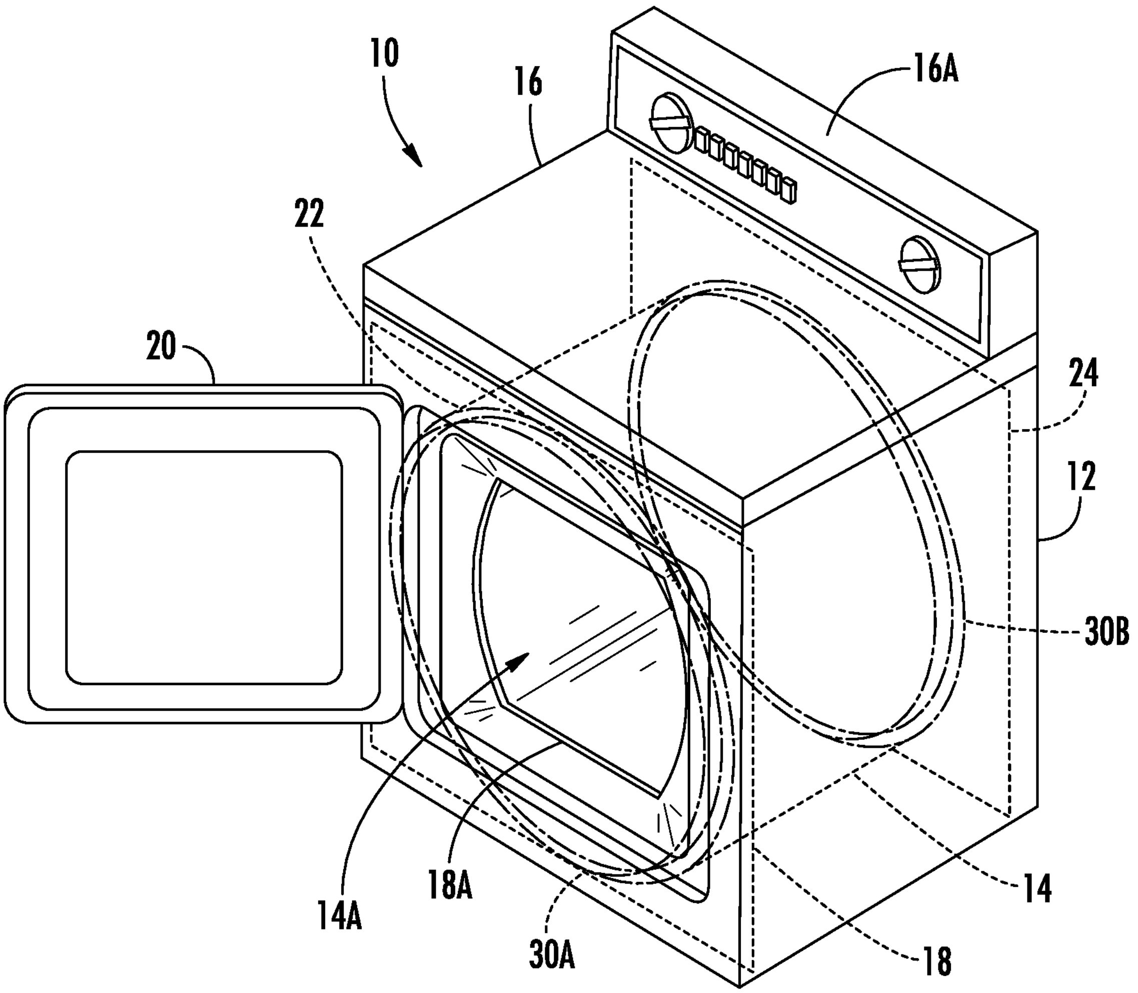
FIG. 1 illustrates a perspective view of an embodiment of a clothes dryer with a rotating drum that includes an embodiment of a dryer seal according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

As used herein, the terms "needled" and "needle-punched" in reference to nonwovens are used interchangeably.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Dryer seals have been shown and described in detail in U.S. Provisional Patent Application Ser. No. 61/806,944 and U.S. Patent Application Ser. No. 14/242,855, which are incorporated herein in their entireties. Additionally, dryer seals have been shown and described in detail in U.S. Provisional Patent Application Ser. No. 62/044,405 and U.S. Patent Application Ser. No. 14/842,827, which are also incorporated herein in their entireties. The dryer seals described provide ample background and understanding of the operation of dryer seals and description of the improvements to the dryer seals that can be enhanced by the present description.

As disclosed herein, dryer seals for use in clothes dryers are provided. The dryer seal can comprise a first substrate that can comprise a body of the dryer seal. The first substrate can have a first end and a second end and a first side and a second side. The first end and the second end of the first substrate can be secured together so that the first base substrate forms at least a portion of an annular shape. The first side of the first substrate can be configured to form a side of the dryer seal that extends toward a bulkhead of a dryer and the second side of the first substrate can be configured to be attached to a drum of a dryer when the dryer seal is installed on a drum in the dryer. The dryer seal can also comprise a second substrate that can be secured to the first substrate. The second substrate can have a first side configured to extend past the first side of the first substrate to form a contact surface of the dryer seal for contacting the bulkhead of the dryer and a second side that can be secured to the first substrate between the first side and the second side of the first substrate. A pointbond nonwoven substrate can be secured between the first substrate and the second substrate. Embodiments of the dryer seals are described in further detail below.

Figure 2:
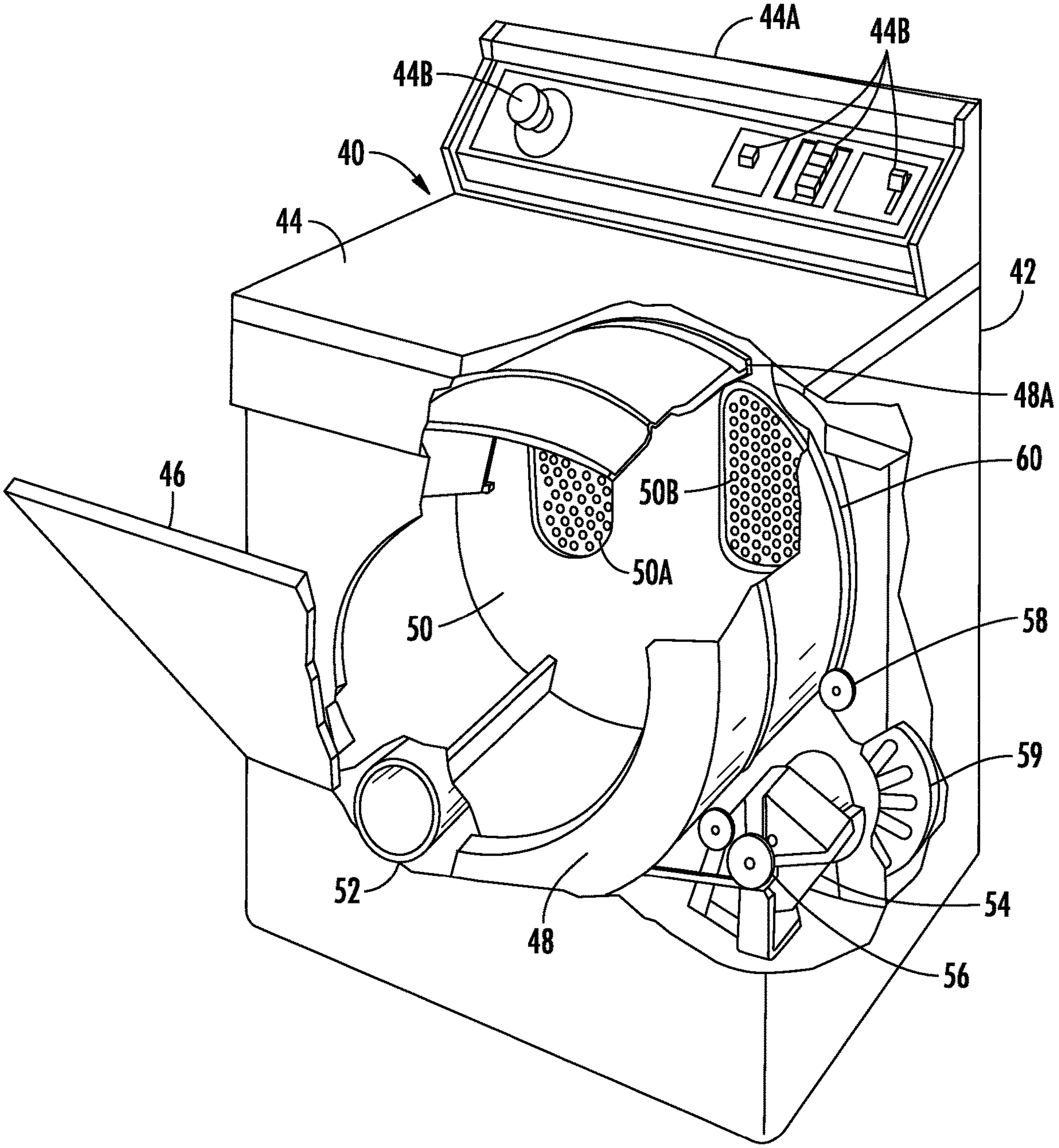
FIG. 2 illustrates a perspective view of another embodiment of a clothes dryer with a rotating drum that uses an embodiment of a dryer seal according to the present subject matter.

Referring now to FIGS. 1 and 2, example embodiments of a domestic clothes dryer are provided that illustrate the general placement and location of dryer seals according to the present disclosure in relation to other components of the respective dryers. In FIG. 1, an embodiment of a dryer 10 comprising a cabinet body 12 housing a heated rotating drum 14 is provided. As illustrated, cabinet body 12 can comprise a top panel 16 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 18 of the cabinet body 12 typically can include a front bulkhead flange 22 (shown schematically as the outer front circular dotted line) surrounding the door opening 18A and projecting into the interior of the cabinet body. In such an embodiment, the front bulkhead flange 22 can be disposed generally around a reduced diameter drum opening. Similarly, cabinet body 12 can comprise a rear bulkhead 24 (shown in dotted lines) that can have a rear bulkhead flange (not shown in FIG. 1) projecting into the interior of the cabinet body and can also be disposed generally around a reduced diameter drum opening.

As shown in FIG. 1, a front seal 30A (shown in dotted circular lines and generally interior to the bulkhead flange 22) can be disposed between the front bulkhead flange 22 of the front bulkhead 18 and a front edge outer wall portion of the drum 14. Similarly, a rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally, the seals 30A, 30B can comprise a structure that includes contact surfaces that can provide a reduced frictional engagement between the bulkheads 18, 24 and the drum 14. The seals 30A, 30B can comprise body structures that can include contact surfaces that create a seal when the dryer is operating within normal temperature ranges. In the event of a dryer drum combustion where a fire in the drum occurs, the structure and configuration of the seals 30A, 30B can help maintain contact with the respective front and/or rear bulkhead as will be explained further below to reduce the likelihood or prevent the early transfer of the drum fire to other portions of the dryer, including the control console. Further, the seals 30A, 30B can help prevent the fire or any flames from exiting the dryer and causing a catastrophic failure.

Referring to FIG. 2, a partial cross-sectional view of a different embodiment of a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater coils or gas burner, and travels axially to the front panel/bulkhead and exits the drum through the screen and fan. It should be understood that the dryer seal technologies disclosed herein can be used in a variety of different dryer configurations.

Dryer 40 can comprise a cabinet body 42 with a top panel 44 having a control console 44A along a rear portion thereof incorporating a plurality of controls 44B for selecting an automatic series of drying steps. The cabinet body 42 can have a front door 46 providing access to the interior of a horizontally rotatable drying drum 48. The cabinet body 42 can also have a non-rotating rear bulkhead 50 with air inlets 50A and air outlets 50B therein for charging the interior of the drum 48 with heated air from a heater 52 and for exhausting moisture laden air. In this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 can also comprise a stationary front bulkhead (not shown) with a front seal (not shown) disposed between the front bulkhead and a front rim of the drum 48.

In operation, the rear seal 60 and the front seal (not shown) used in dryer 40 can prevent or at least reduce the draw of ambient air from around the drum 48, especially as compared to conventional dryer seals currently being used. Instead, air is drawn more efficiently through heater 52 and into the drum 48 through air inlets 50A before eventually being discharged through outlets 50B. As above, the rear seal 60 and the front seal can comprise a structure and/configuration that improves contact between the rear seal 60 and the front seal and the rear bulkhead 50 and between the front bulkhead, respectively, as explained in more detail below.

Thus, dryer systems can use a high-performance extraction fan on the exhaust exit of the appliance that draws cold air into a heater intake duct that heats and raises the temperature of the air as it passes into the dryer clothes container/drum. The incoming hot air absorbs the moisture and humidity from the clothes and wet air as it is drawn across the agitating load and then exits through the exhaust duct on the rear bulkhead. In theory, the perfect dryer cycle would have a completely leak free air flow path from suction input to blown exhaust. The dryer seals disclosed herein help to improve air flow and increase dryer efficiency. The structure and shape of the seals can be dependent upon the design of the interior of the respective dryer in which the seals are to be used and particularly dependent upon the designed engagement between the respective bulkheads and the drum used within the dryer. In particular, the drum size, drum opening and rim configuration, the bulkhead shape and configuration can impact the determination of the construction, structure, and shape of the respective seals as well as the materials used therein. Depending on the design of the respective dryer, the seal for use between the rear rim of the drum and the rear bulkhead can comprise different structure. For example, the seals can be T-shaped cross-sectional seals as described further below in more detail.

Figure 3A:
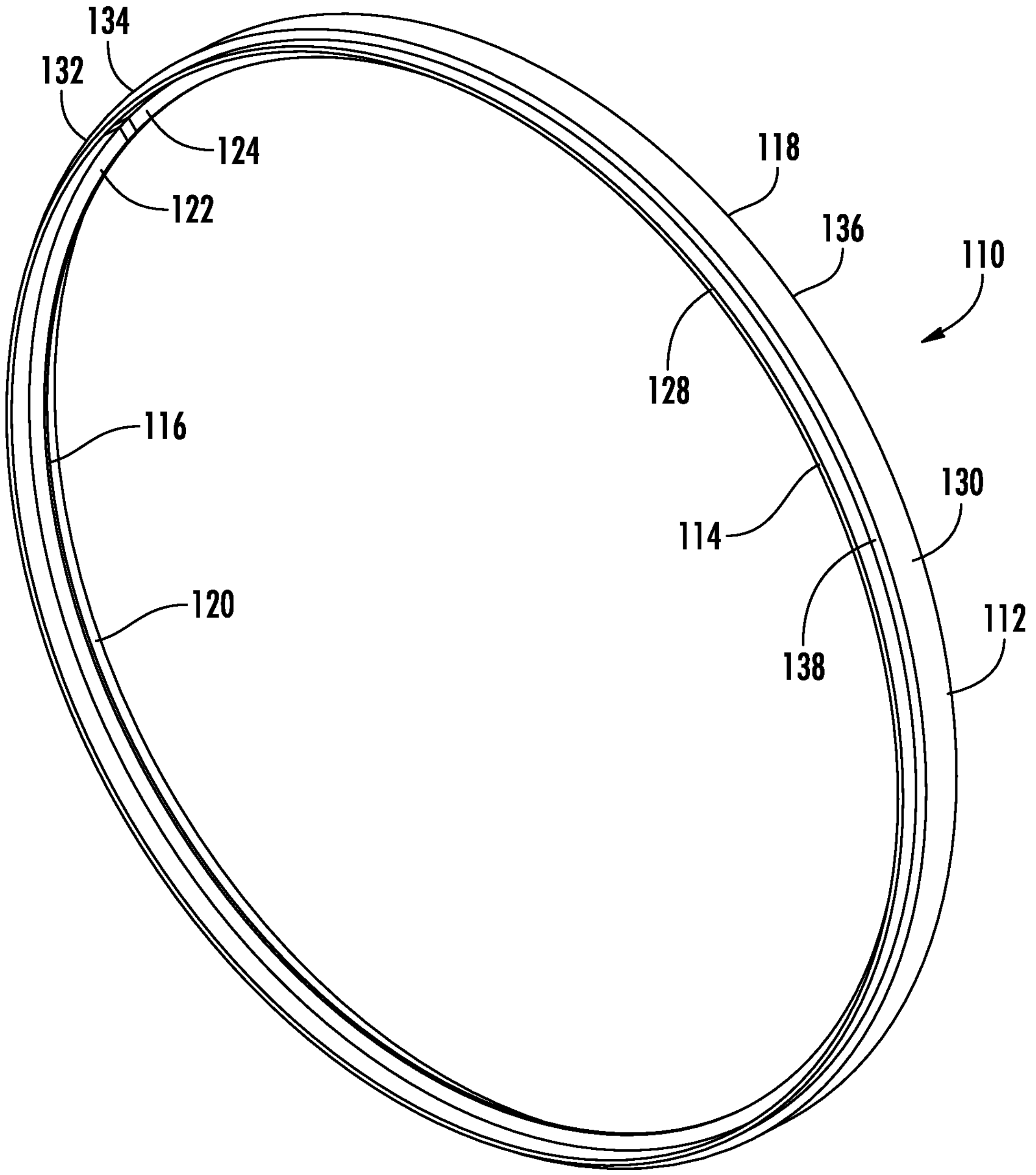
FIGS. 3A and 3B illustrate a respective perspective view and front plan view of an example embodiment of a dryer seal for a clothes dryer according to the present subject matter.
Figure 3B:
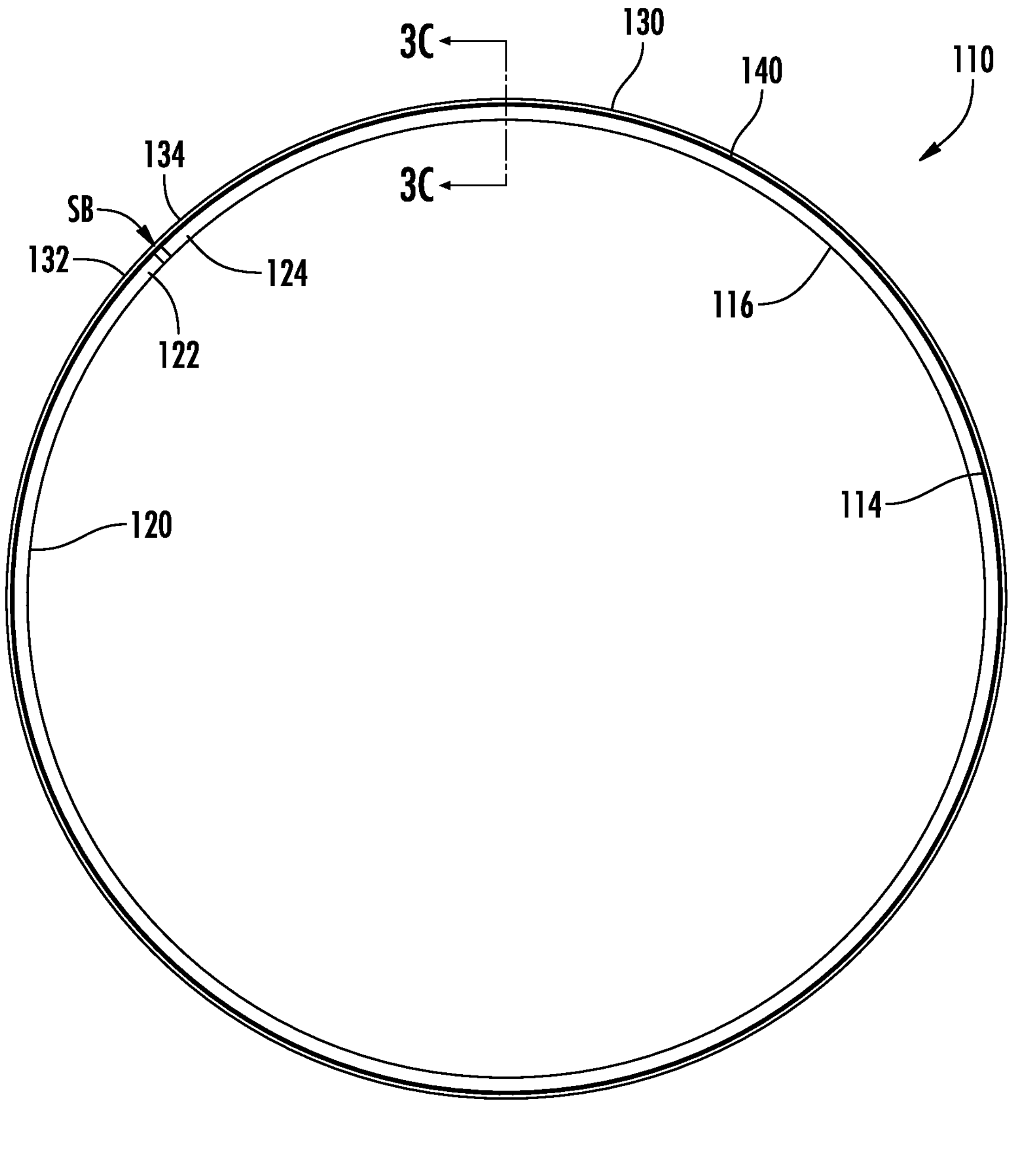
Figure 3C:
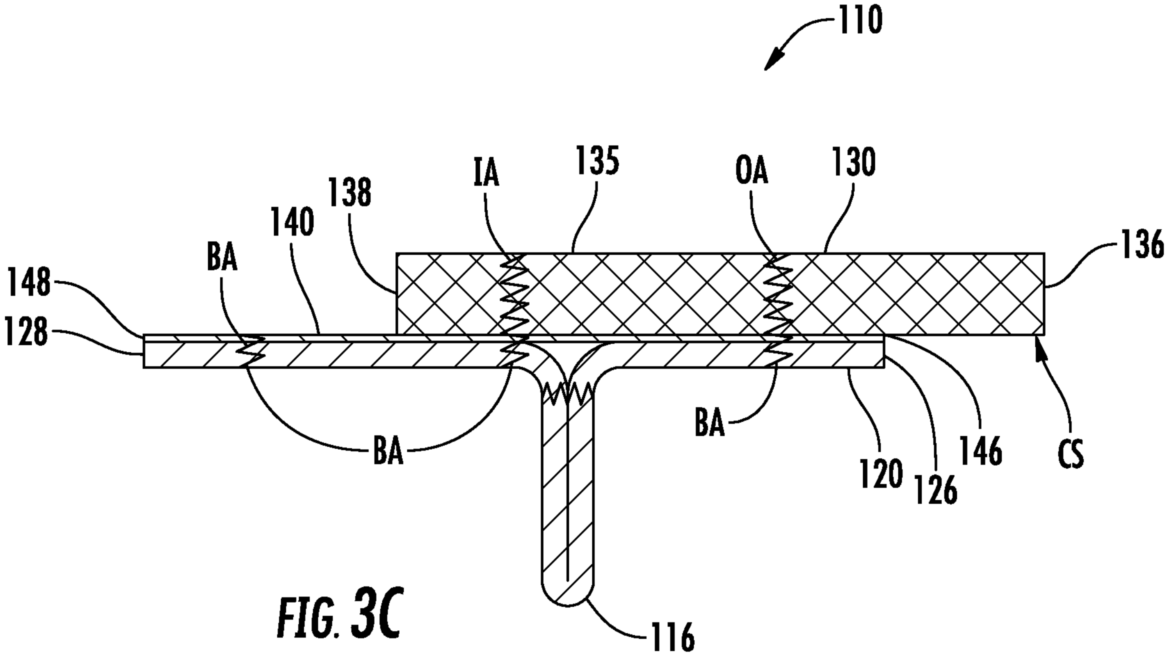
FIG. 3C illustrates a schematic cross-sectional view of the embodiment of the dryer seal according to FIG. 3B taken along the lines B-B.

Referring to FIGS. 3A, 3B and 3C, an embodiment of an annular h rear dryer seal, generally 110, is provide that can comprise a first substrate 120 and a second substrate 130 that are secured together. The first substrate 120 has a first end 122 and a second end 124 as well as a first side 126 and a second side 128. The second substrate 130 also has a first end 132 and a second end 134 as well as a first side 136 and a second side 138. The first substrate 120 can comprise at least partially of a polymer, for example a thermoplastic polymer such as a polyester. The second substrate 130 can comprise at least partially of a higher melt polymer, for example, a fire retardant polymer, such as an aramid.

The first end 122 and the second end 124 of the first substrate 120 can be secured together so that the first substrate 120 forms at least a portion of an annular shape. As shown in FIGS. 3A and 3B, the first end 122 and the second end 124 of the first substrate 120 can be secured together to form the complete annular shape. In some embodiments, the first and second ends 132, 134 of the second substrate 130 can also be secured together.

The first substrate 120 can comprise a nonwoven fabric. For example, the first substrate 120 can comprise a needled nonwoven fabric. In some embodiments, the first substrate 120 can comprise a needled nonwoven fabric comprising polymer fibers. For example, the first substrate 120 can comprise a needled nonwoven fabric comprising thermoplastic polymer fibers. For instance, in some embodiments, the first substrate 120 can comprise a needled nonwoven fabric comprising polyester (PET) fibers. In other embodiments, other polymer fibers may be used, such as but not limited to polyethylene.

The first substrate 120 can be configured to form a side 114 of the dryer seal that is attached the drum in the dryer. For example, the side 114 of the dryer seal 110 can be formed by the second side 128 of the first substrate 120, which can be secured to the drum of the dryer by, for example, an adhesive. The first substrate 120 can also be configured to form a tonsil 116 that can extend outward between the first side 126 or the second substrate 128 of the first substrate 120 at an angle to either the first side 126 or the second substrate 128 of the first substrate 120 for insertion between the dryer drum and the bulkhead when the seal is installed. Further, the first side 126 of the first substrate 120 can be configured to provide support to the second substrate 130 such that the first side 136 of the second substrate 130 to extend out to form a side 112 of the dryer seal 110 that forms a contact surface CS of the dryer seal 110 at a rear section 118 of the seal 110 that is configured to contact the bulkhead of the dryer when installed on a drum in a dryer.

The second base substrate 130 can comprise a nonwoven fabric comprising a high temperature material that has a higher melting point than the polymer of the first substrate 120 that forms a wiper for contacting a bulkhead of a dryer. For example, the second substrate 130 can comprise a needled nonwoven fabric comprising fire retardant polymer fibers. In some embodiments, the second substrate 130 can comprise a needled nonwoven fabric comprising aramid fibers, that form an aramid wiper that forms a contact surface CS for contacting a bulkhead of a dryer.

The second substrate 130 can be secured to the first substrate 120 at the second side 128 of the first substrate 120. In particular, the first side 136 of second substrate 130 can be configured to extend past the first side 126 of the first substrate 120 to form the contact surface CS of the dryer seal 110 for contacting a bulkhead of a dryer, while the second side 138 of second substrate 130 can be secured to the first substrate between the first side 126 and the second side 128 of the first substrate 120. The first substrate 120 and the second substrate 130 can be secured together at the second side 128 of the first substrate 120 by at least one of sewing, needle-punching, ultrasonic welding, or heat sealing. For example, second substrate 130 can be secured to first substrate 120 by stitch-bonding SB as shown in FIG. 3B. In some embodiments, the second substrate 130 can be secured to first substrate 120 at an outward attachment OA position between the tonsil 116 and the first side 126 of the first substrate 120 and/or at an inward attachment IA position between the second side 128 of the first substrate 120 and the tonsil 116.

The dryer seal 110 can comprise a pointbond nonwoven substrate 140 secured between the first substrate 120 and the second substrate 130. The pointbond nonwoven substrate 140 can comprise a polyester polymer and can have a weight of between about 85 grams/square meter (gsm) and about 140 gsm. The pointbond nonwoven substrate 140 can have limited stretch and provides a firm backing to the tonsil 116 formed by the first substrate 120 during the fitting and adhesion operation during assembly and installation into a dryer. The pointbond nonwoven substrate 140 can act as a 'Belville' spring feature for holding the contact surface CS of the second substrate 130 of the dryer seal 110 in position to contact a bulkhead in a dryer to form a better sealing effect when the dryer seal 110 is installed in a dryer. This Belville spring feature of the pointbond nonwoven substrate 140 can aid with ensuring uniform adhesion to the first substrate 120 and better positioning of the tonsil 116. In particular, the pointbond nonwoven substrate 140 can provide a radial energy to the dryer seal 110, specifically the second substrate 130 to ensure contact/proximity with rear bulkhead during rotation and provide an improved seal to the hot air contained in the dryer drum. Additionally, the pointbond nonwoven substrate 140 can thereby provide a 360° uniform energy to the second substrate 130 to improve seal and assist the negative drum pressure pull on the rear seal. The pointbond nonwoven substrate 140 can improve the containment of small items in the drum by the dryer seal 110 during drying process by reducing and closing the seal bulkhead feature. Additionally, the pointbond nonwoven substrate 140 can also improve the drum containment of small items due to compensating for excess tolerance of drum and bulkhead components.

In the event of Dryer Drum combustion, the radial energy of the pointbond nonwoven substrate 140 can improve the positioning of the second substrate 130 in the event of combustion in drum. For example, the radial energy of the pointbond nonwoven substrate 140 can position and retain the second substrate 130 in close location/contact with a bulkhead of the dryer to prevent the early transfer of drum fire to controller console and/or allow flames to exit from appliance that can cause a catastrophic failure. In general, the pointbond nonwoven substrate 140 can less susceptible to temperature change compared to the vinyl ribbon used in conventional dryer seals that are currently being used in the dryer industry.

Figure 4:
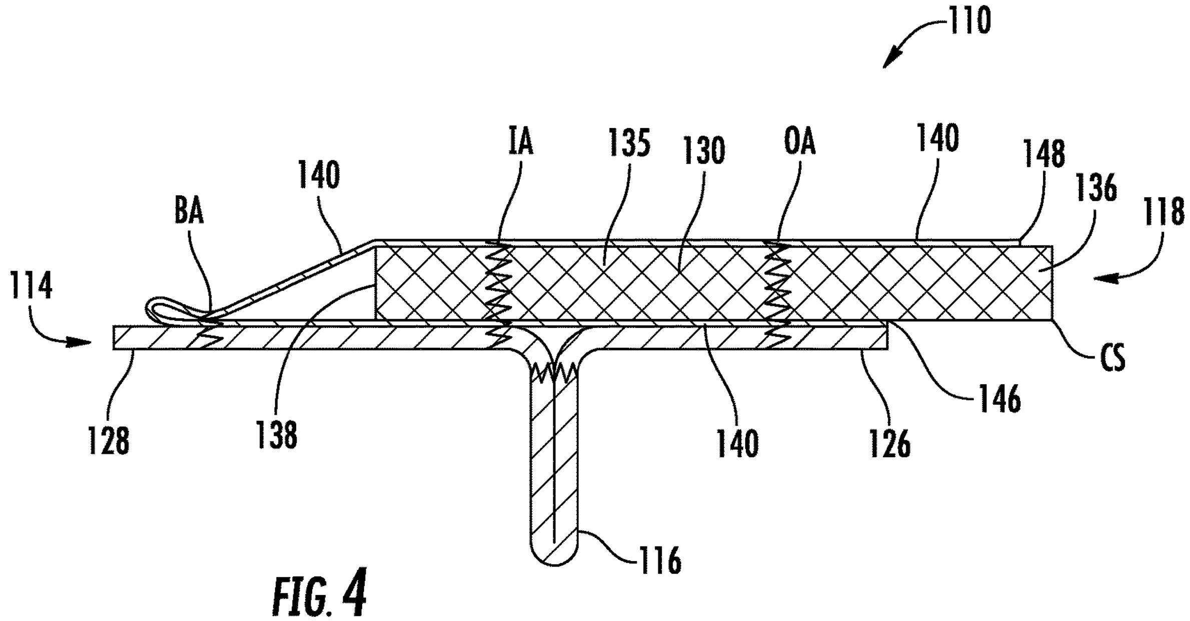
FIG. 4 illustrates a schematic cross-sectional view of another embodiment of a dryer seal according to the present subject matter.

Referring to FIG. 4, a cross-sectional view of another embodiment of a dryer seal 110 is provided. The dryer seal 110 can comprise a first substrate 120 that comprises a body of the dryer seal. The first substrate 120 can have a first end and a second end as described above as well that can be secured together so that the first base substrate forms at least a portion of an annular shape as a first side 126 and a second side 128. The first side 126 of the first substrate 120 can configured to form a side 112 of the dryer seal 110 that can extend toward a bulkhead of a dryer when installed. The second side 128 of the first substrate 120 can be configured to be attached to a drum of a dryer when the dryer seal is installed on a drum in the dryer. The dryer seal 110 can comprise a second substrate 130 that can be secured to the first substrate 120. The second substrate 130 can have a first side 136 configured to extend past the first side 126 of the first substrate 120 to form a contact surface CS of the dryer seal 110 for contacting the bulkhead of the dryer and a second side 128 that can be secured to the first substrate 120 between the first side 126 and the second side 128 of the first substrate 120. Further, the dryer seal 110 can comprise a pointbond nonwoven substrate 140 having a first side 146 and a second side 148. The first side 146 of the pointbond nonwoven substrate 140 can be positioned proximal the first side 126 of the first substrate 120 and secured between the first substrate 120 and second substrate 130 with the pointbond nonwoven substrate 140 extending toward the second side 128 of the first substrate 128 past the second end 138 of the second substrate 130 to a back attachment position BA where the pointbond nonwoven substrate 140 is attached to the first substrate 120 and folded back over a top surface 135 of the second substrate 130 such that the second side 148 of the pointbond nonwoven substrate 140 is positioned above the second substrate 130. The second side 148 of the pointbond nonwoven substrate 140 can extend past the first side 126 of the first substrate 120 but short of the first side 136 of the second substrate 130. Thereby, the first side 126 of the first substrate 120, the first and second sides 146, 148 of the pointbond nonwoven substrate 140 and the first side 136 of the second substrate 130 can form a rear section 118 of the dryer seal 110 from which the second substrate 130 extends to contact the bulkhead of the dryer.

As shown in FIG. 4 and described above, the first substrate 120 can form a tonsil 116 that extends downward between the first side 126 and the second side 128 of the first substrate 120. The tonsil 116 can be configured to extend between a drum of a dryer and a bulkhead of a dryer. The back attachment position BA of the pointbond nonwoven substrate 140 where the pointbond nonwoven substrate 140 is secured to the first substrate 120 can be between the second side 126 of the first substrate 120 and a position at which the tonsil 116 extends downward. Further, the first substrate 120, the second substrate 130 and the pointbond nonwoven substrate 140 can be secured together proximate to the first side 126 of the first substrate 120 at an outward attachment position OA which can be between the first side 126 of the first substrate 120 and the position at which the tonsil 116 extends downward. In some embodiments, the first substrate 120, the second substrate 130 and the pointbond nonwoven substrate 140 can be secured together the outward attachment position OA by at least one of sewing, needle-punching, ultrasonic welding, or heat sealing. Similarly, the first substrate 120, the second substrate 130 and the pointbond nonwoven substrate 140 can be secured together proximate to the first side 126 of the first substrate 120 at an inward attachment position IA which can be between the second side 128 of the first substrate 120 and the position at which the tonsil 116 extends downward. In some embodiments, the first substrate 120, the second substrate 130 and the pointbond nonwoven substrate 140 can be secured together the inward attachment position IA by at least one of sewing, needle-punching, ultrasonic welding, or heat sealing.

As with the embodiment described above, the pointbond nonwoven substrate 140 can act as a Bellville spring providing a radial energy to the second substrate 130 to improve contact with and proximity to a bulkhead of a dryer. The radial energy of the pointbond nonwoven substrate 140 can improve the sealing of the dryer seal to assist in increasing the negative pressure pull on the dryer seal 110. Additionally, the radial energy of the pointbond nonwoven substrate 140 can improve small item containment within the drum during a drying process. Further, the radial energy of the pointbond nonwoven substrate 140 can improve the positioning of the first side 136 of the second substrate 130 in the event of a dryer drum combustion to prevent an early transfer of a drum fire to a control console of the dryer and to prevent flames from exiting from the dryer. Without wishing to be bound by any particular theory, it is believed that the second side 148 of the pointbond nonwoven substrate 140 being positioned above the second substrate 130 with the second side 148 of the pointbond nonwoven substrate 140 extending past the first side 126 of the first substrate 120 but short of the first side 136 of the second substrate 130 can increase the Belville spring action of the pointbond nonwoven substrate 140 on the second substrate 130 and improves the position of the first side 136 and the contact surface of the second substrate 130 relative to the bulkhead of the dryer when the dryer seal 110 is installed in the dryer.

In some embodiments, the pointbond nonwoven substrate can comprise a first pointbond nonwoven substrate that can extend between the second substrate and the first substrate and a second pointbond nonwoven substrate that can extend above a top surface of the second substrate. The second pointbond nonwoven substrate can extend past the first side of the first substrate but short of the first side of the second substrate. The first pointbond nonwoven substrate and the second pointbond nonwoven substrate can be secured to the first substrate at a back attachment position between the second side of the first substrate and second side of the second substrate as well as at the inward attachment position and the outward attachment position.

Figure 5A:
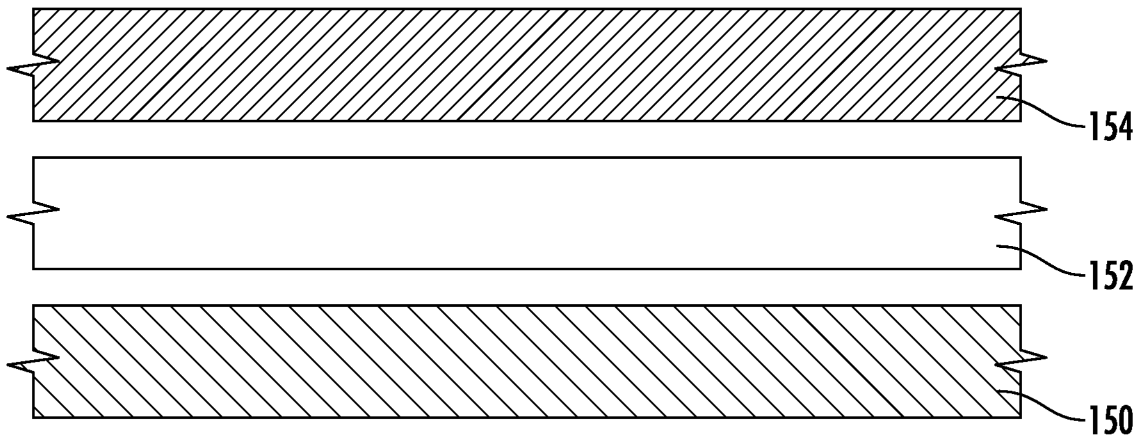
FIG. 5A illustrates a portion of a conventional intermediate substrate used in conventional dryer seals and two embodiments of pointbond nonwoven substrates used in dryer seals according to the present subject matter.
Figure 5B:
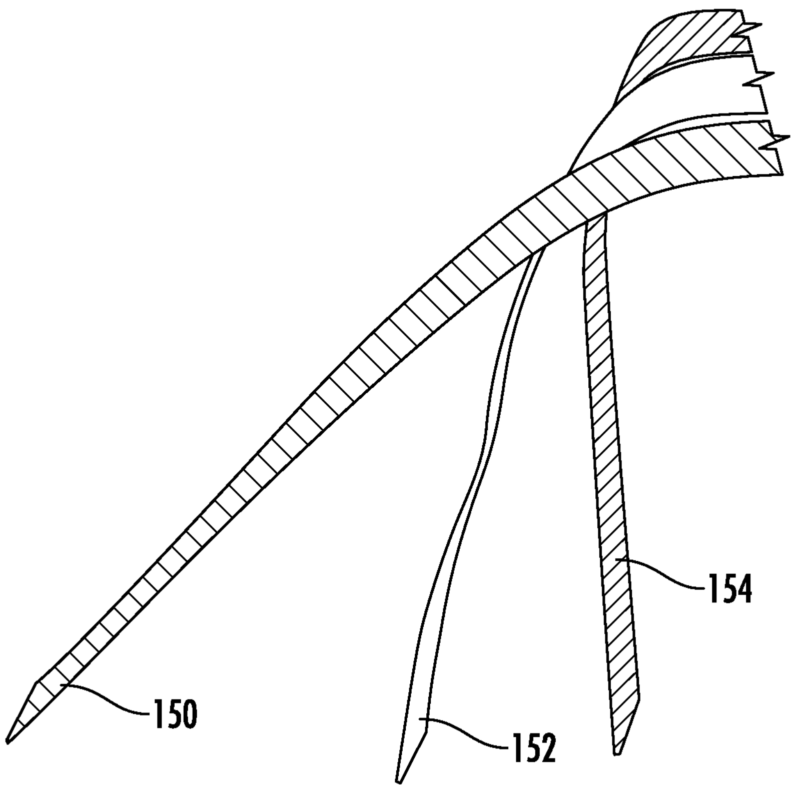
FIGS. 5B and 5C illustrate the stiffness of the conventional intermediate substrate used in conventional dryer seals and two embodiments of pointbond nonwoven substrates according to the present subject matter shown in FIG. 5A that were tested using ASTM D1388 Taber Cantilever Material Stiffness Test.
Figure 5C:
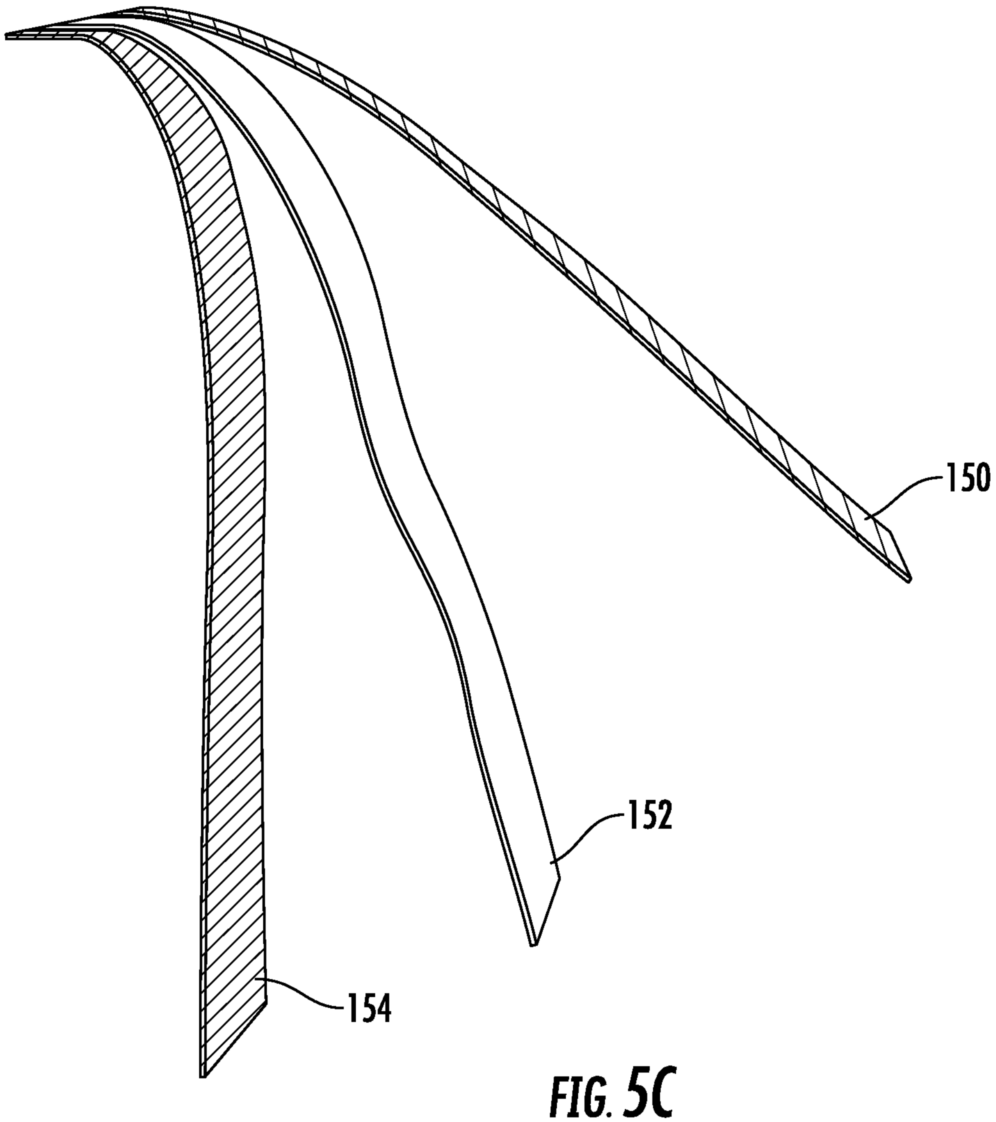

The pointbond nonwoven substrate 140 can also be lighter than the vinyl ribbon used in conventional dryer seals that are currently being used in the dryer industry. For example, in some embodiments, the pointbond nonwoven substrate 140 can also be about 50% lighter than the vinyl ribbon in component weight. Additionally, the pointbond nonwoven substrate 140 can be stiffer than the vinyl ribbon used in conventional dryer seals that are currently being used in the dryer industry. As shown in FIG. 5A-5C, pointbond nonwoven substrates 150 that weighed about 140 gsm, pointbond nonwoven substrates 152 that weighed about 85 gsm, and vinyl ribbon substrates 154 that weighed about 555 gsm used in conventional dryer seals that are currently being used in the dryer industry were tested using ASTM D1388 Taber Cantilever Material Stiffness Test. While not showing the actual testing, FIGS. 5B and 5C illustrate examples of the stiffness of the pointbond nonwoven substrate 150, pointbond nonwoven substrates 152, vinyl ribbon substrate 154 relative to one another. The results showed that both the heavier pointbond nonwoven substrates 150 and the lighter pointbond nonwoven substrates 152 were stiffer than the vinyl ribbon substrates 154. For example, the vinyl ribbon substrates 154 had a cantilever measurement of about 39 mm to about 43 mm, the pointbond nonwoven substrates 150, 152 had a cantilever measurement using the ASTM D1388 test of between about 65 mm or greater. The heavier pointbond nonwoven substrates 150 had a cantilever measurement using the ASTM D1388 test of about 83 mm or greater. For example, the lighter pointbond nonwoven substrates 152 as tested can have a cantilever measurement using the ASTM D1388 test of between about 65 mm and about 69 mm. The heavier pointbond nonwoven substrate 150 can have a cantilever measurement using the ASTM D1388 test of between about 83 mm and about 87 mm. Thus, the pointbond nonwoven substrates 150, 152 can have a cantilever measurement using the ASTM D1388 test of between about 65 mm and about 87 mm.

When the embodiments of the dryer seals 110 as disclosed herein are installed within the dryer, an airflow efficiency within the dryer can increase due to use of the dryer seal. For example, the dryer seal can increase the airflow efficiency within the dryer to within the range of about 55% and about 59%.

The pointbond nonwoven substrate as used in the dryer seals described herein can act as an energizer to the second substrate that can comprise relatively soft aramid fibers. The pointbond nonwoven substrate improves the ability of the contact surface of the second substrate to adjust to variations in fit, drum roundness, bulkhead squareness and general sealing of the dryer drum. This additional structure can provide a structural spring to augment the second substrate contact memory or wiper memory.

To understand the implications of seal performance, a test was devised to measure airflow at the suction heater intake and the blown exhaust outlet. Mounts were constructed to locate an anemometer at the two locations and the airflow suction was measured as a percentage of exhaust flow. The test was repeated over a sample of 12 production dryers with an average 39% efficiency in intake air.

Two dryer appliances were random selected and a program of leakage sealing commencing at the suction heater intake using HT silicon & adhesive HT metal foil produced an immediate improvement to 58% efficiency of intake air. The other obvious leak paths as the air moved through the appliance were systematically sealed and raised airflow efficiency to 60%.

At this point the only airflow sealing features still to production specification were the front & rear drum seals. Both seals were removed, a substitute bearing block inserted in the front panel seal carrier to permit dynamic testing. The airflow efficiency was 22.2% with no drum seals.

The production front seal was refitted and without a rear seal the dynamic airflow efficiency was 52.2%, the non-permeable intumescent coupled with the 14 ounces/square yard wiper indicates excellent front seal sealing properties.

This exercise suggests the current rear seal architecture has limited effect on dynamic airflow and effects the overall airflow by less than 10%. Several tests were conducted using thermoset airfoil formed rear seal tonsils and wipers in contact with the rear bulkhead during rotation which restored efficiency to 60% but would not be practical or commercially viable for a production appliance.

Tests were run with conventional rear seals currently used in such dryer appliances. After 235 hours of run time, the dryer appliances using conventional rear seals had an ambient temperatured air flow efficiency of 50% and a heated air flow efficiency of 47%. Alternatively, after 235 hours of run time, the dryer appliances using dryer seals as disclosed herein had an ambient temperatured air flow efficiency of 59% and a heated air flow efficiency of 55%. Thus, a dryer seal as disclosed herein can be used to replace the current production rear seal and improved overall dynamic airflow by 3% representing about a 30+% improvement in performance of rear seal airflow. In conclusion, the dryer seal as disclosed herein used as a rear seal appears to have a 6-9% contribution to dynamic airflow efficiency assuming all appliance tolerances are achieved.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A dryer seal comprising:
- a first substrate that comprises a body of the dryer seal, the first substrate having a first end and a second end and a first side and a second side;
- the first end and the second end of the first substrate secured together so that the first base substrate forms at least a portion of an annular shape;
- the first side of the first substrate configured to form a side of the dryer seal that extends toward a bulkhead of a dryer and the second side of the first substrate configured to be attached to a drum of a dryer when the dryer seal is installed on a drum in the dryer;
- a second substrate being secured to the first substrate, the second substrate having a first side configured to extend past the first side of the first substrate to form a contact surface of the dryer seal for contacting the bulkhead of the dryer and a second side that is secured to the first substrate between the first side and the second side of the first substrate; and
- a pointbond nonwoven substrate secured between the first substrate and the second substrate.

2. The dryer seal according to claim 1, wherein the first substrate forms a tonsil that is configured to extend between the drum of the dryer and the bulkhead of the dryer and the first side of the first substrate and the first side of the second substrate form a rear section of the dryer seal from which the second substrate extends to contact the bulkhead of the dryer when the seal is installed in the dryer.

3. The dryer seal according to claim 1, wherein the pointbond nonwoven substrate is positioned proximate to the first side of the first substrate between the first substrate and second substrate with the pointbond nonwoven substrate extending toward the second side of the first substrate past the second end of the second substrate to a back attachment position where the pointbond nonwoven substrate is attached to the first substrate and folded back over a top surface of the second substrate such that a second side of the pointbond nonwoven substrate is positioned above the second substrate.

4. The dryer seal according to claim 3, wherein the second side of the pointbond nonwoven substrate extends past the first side of the first substrate above the second substrate but short of the first side of the second substrate.

5. The dryer seal according to claim 3, wherein the first substrate forms a tonsil that extends downward between the first side and the second side of the first substrate and is configured to extend between the drum of the dryer and the bulkhead of the dryer and wherein the back attachment position of the pointbond nonwoven substrate to the first substrate is between the second side of the first substrate and a position at which the tonsil extends downward.

6. The dryer seal according to claim 5, wherein the second substrate and the pointbond nonwoven substrate are secured to the first substrate at an inward attachment position between the back attachment position and the position at which the tonsil extends downward and at an outward attachment position between the position at which the tonsil extends downward and the first side of the first substrate.

7. The dryer seal according to claim 6, wherein the second side of the pointbond nonwoven substrate extends past the first side of the first substrate but short of the first side of the second substrate.

8. The dryer seal according to claim 6, wherein the pointbond nonwoven substrate acts as a Bellville spring providing a radial energy to the second substrate to improve contact with and proximity to the bulkhead of the dryer.

9. The dryer seal according to claim 8, wherein the radial energy of the pointbond nonwoven substrate improves the positioning of the second substrate in the event of a dryer drum combustion to prevent an early transfer of a drum fire to a control console of the dryer and to prevent flame exit from the dryer.

10. The dryer seal according to claim 1, wherein the pointbond nonwoven substrate comprises a first pointbond nonwoven substrate that extends between the second substrate and the first substrate and a second pointbond nonwoven substrate that extends above a top surface of the second substrate and extends past the first side of the first substrate but short of the first side of the second substrate, the first pointbond nonwoven substrate and the second pointbond nonwoven substrate being secured to the first substrate at a back attachment position between the second side of the first substrate and second side of the second substrate.

11. The dryer seal according to claim 1, wherein the pointbond nonwoven substrate has a cantilever measurement using the ASTM D1388 test of about 65 mm or greater.

12. The dryer seal according to claim 1, wherein the first substrate, the second substrate and the pointbond nonwoven substrate are secured together proximate to the first side of the first substrate at an outward attachment position by at least one of sewing, needle-punching, ultrasonic welding, or heat sealing.

13. The dryer seal according to claim 12, wherein the first substrate, the second substrate and the pointbond nonwoven substrate are secured together proximate to the second side of the first substrate at an inward attachment position by at least one of sewing, needle-punching, ultrasonic welding, or heat sealing.

14. The dryer seal according to claim 1, wherein the first substrate and the pointbond nonwoven substrate are secured together at a back attachment position between the second side of the first substrate and the second end of the second substrate by at least one of sewing, needle-punching, ultrasonic welding, or heat sealing.

15. The dryer seal according to claim 1, wherein the dryer seal increases an airflow efficiency within the dryer to within the range of about 55% and about 59%.

16. A dryer seal comprising:

a first substrate that comprises a body of the dryer seal, the first substrate having a first end and a second end and a first side and a second side;

the first end and the second end of the first substrate secured together so that the first base substrate forms at least a portion of an annular shape;

the first side of the first substrate configured to form a side of the dryer seal that extends toward a bulkhead of a dryer and the second side of the first substrate configured to be attached to a drum of a dryer when the dryer seal is installed on a drum in the dryer;

a second substrate being secured to the first substrate, the second substrate having a first side configured to extend past the first side of the first substrate to form a contact surface of the dryer seal for contacting the bulkhead of the dryer and a second side that is secured to the first substrate between the first side and the second side of the first substrate; and a pointbond nonwoven substrate having a first side and a second side, the first side of the pointbond nonwoven substrate being positioned proximal the first side of the first substrate and secured between the first substrate and second substrate with the pointbond nonwoven substrate extending toward the second side of the first substrate past the second end of the second substrate to a back attachment position where the pointbond nonwoven substrate is attached to the first substrate and folded back over a top surface of the second substrate such that the second side of the pointbond nonwoven substrate is positioned above the second substrate, the second side of the pointbond nonwoven substrate extending past the first side of the first substrate but short of the first side of the second substrate.

17. The dryer seal according to claim 16, wherein the first substrate forms a tonsil that extends downward between the first side and the second side of the first substrate and is configured to extend between the drum of the dryer and the bulkhead of the dryer and wherein the back attachment position of the pointbond nonwoven substrate to the first substrate is between the second side of the first substrate and a position at which the tonsil extends downward.

18. The dryer seal according to claim 16, wherein the pointbond nonwoven substrate acts as a Bellville spring providing a radial energy to the second substrate to improve contact with and proximity to the bulkhead of the dryer.

19. The dryer seal according to claim 18, wherein the radial energy of the pointbond nonwoven substrate improves the positioning of the second substrate in the event of a dryer drum combustion to prevent an early transfer of a drum fire to a control console of the dryer and to prevent flame exit from the dryer.

20. The dryer seal according to claim 16, wherein the pointbond nonwoven substrate comprises a polyester pointbond nonwoven fabric having a weight of between about 85 grams/square meter and about 140 grams/square meter.

21. The dryer seal according to claim 16, wherein the pointbond nonwoven substrate has a cantilever measurement using the ASTM D1388 test of about 65 mm or greater.

* * * * *